US012112682B2

(12) United States Patent
Kim et al.

(10) Patent No.: US 12,112,682 B2
(45) Date of Patent: Oct. 8, 2024

(54) DISPLAY APPARATUS AND METHOD OF DRIVING DISPLAY PANEL USING THE SAME

(71) Applicant: Samsung Display Co., Ltd., Yongin-Si (KR)

(72) Inventors: Seongjun Kim, Seoul (KR); Youngsoo Sohn, Yongin-si (KR); Jae Woo Ryu, Suwon-si (KR); Kwan-Young Oh, Hanam-si (KR); Seungyoung Choi, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 17/895,623

(22) Filed: Aug. 25, 2022

(65) Prior Publication Data

US 2023/0169907 A1 Jun. 1, 2023

(30) Foreign Application Priority Data

Nov. 29, 2021 (KR) ........................ 10-2021-0167015

(51) Int. Cl.
*G09G 3/20* (2006.01)

(52) U.S. Cl.
CPC ..... *G09G 3/2092* (2013.01); *G09G 2310/027* (2013.01)

(58) Field of Classification Search
CPC ........................ G09G 3/2092; G09G 2310/027
See application file for complete search history.

(56) References Cited

U.S. PATENT DOCUMENTS

| | | | | |
|---|---|---|---|---|
| 6,552,705 B1 * | 4/2003 | Hirota | G09G 3/3688 | 345/94 |
| 7,554,535 B2 * | 6/2009 | Sasaki | G09G 3/3648 | 345/206 |
| 7,602,365 B2 * | 10/2009 | Endo | G09G 3/3614 | 345/55 |
| 7,821,487 B2 * | 10/2010 | Tanaka | G09G 3/3688 | 345/208 |
| 7,956,832 B2 * | 6/2011 | Tanaka | G09G 3/3648 | 345/204 |
| 8,072,410 B2 * | 12/2011 | Park | G09G 3/3677 | 345/100 |

(Continued)

FOREIGN PATENT DOCUMENTS

| | | |
|---|---|---|
| KR | 10-2019-0051411 A | 5/2019 |
| KR | 10-2020-0029178 A | 3/2020 |
| KR | 10-2145391 B1 | 8/2020 |

*Primary Examiner* — Michael J Jansen, II
(74) *Attorney, Agent, or Firm* — Innovation Counsel LLP

(57) ABSTRACT

A display apparatus includes a display panel, a driving controller, a gate driver and a data driver. The driving controller is configured to insert a compensation image to first image data including a normal image to generate second image data. The gate driver is configured to shift an output time of a gate signal and to output the gate signal having a shifted output time to the display panel. The data driver is configured to generate a data voltage based on the second image data and to output the data voltage to the display panel. A gate shift amount when the compensation image is applied is substantially the same as a gate shift amount immediately before the compensation image is applied.

28 Claims, 13 Drawing Sheets

(56) References Cited

U.S. PATENT DOCUMENTS

| | | | | |
|---|---|---|---|---|
| 8,279,150 | B2 * | 10/2012 | Kim | G09G 3/3677 345/92 |
| 8,451,209 | B2 * | 5/2013 | Sugino | G09G 3/342 725/38 |
| 10,810,952 | B2 * | 10/2020 | Lim | G09G 3/3611 |
| 10,867,570 | B2 * | 12/2020 | Lee | G09G 3/3688 |
| 10,902,783 | B2 * | 1/2021 | Park | G09G 3/3233 |
| 11,282,441 | B2 * | 3/2022 | Kim | G09G 3/2092 |
| 2004/0189583 | A1 * | 9/2004 | Park | G09G 3/3677 345/100 |
| 2004/0246242 | A1 * | 12/2004 | Sasaki | G09G 3/342 345/204 |
| 2005/0259064 | A1 * | 11/2005 | Sugino | G09G 3/342 345/102 |
| 2006/0022933 | A1 * | 2/2006 | Endo | G09G 3/3614 345/98 |
| 2007/0001960 | A1 * | 1/2007 | Kim | G09G 3/3677 345/92 |
| 2007/0132674 | A1 * | 6/2007 | Tsuge | G09G 3/2074 345/77 |
| 2007/0152947 | A1 * | 7/2007 | Tanaka | G09G 5/001 345/100 |
| 2008/0024404 | A1 * | 1/2008 | Tanaka | G09G 3/3648 345/87 |
| 2019/0333456 | A1 * | 10/2019 | Lim | G09G 3/3406 |
| 2019/0340989 | A1 * | 11/2019 | Lee | G09G 3/006 |
| 2020/0074932 | A1 * | 3/2020 | Park | G09G 3/3266 |
| 2021/0272505 | A1 * | 9/2021 | Kim | G09G 3/36 |

* cited by examiner

DISPLAY APPARATUS AND METHOD OF DRIVING DISPLAY PANEL USING THE SAME

PRIORITY STATEMENT

This application claims priority under 35 U.S.C. § 119 to Korean Patent Application No. 10-2021-0167015, filed on Nov. 29, 2021, in the Korean Intellectual Property Office KIPO, the contents of which are herein incorporated by reference in their entireties.

BACKGROUND

1. Field

Embodiments of the present inventive concept relate to a display apparatus, a method of driving the display apparatus and a display driving system of the display apparatus. More particularly, embodiments of the present inventive concept relate to a display apparatus determining a gate shift value for delaying a gate signal by considering a compensation image, a method of driving the display apparatus and a display driving system of the display apparatus.

2. Description of the Related Art

Generally, a display apparatus includes a display panel and a display panel driver. The display panel displays an image based on input image data. The display panel includes a plurality of gate lines, a plurality of data lines and a plurality of pixels. The display panel driver includes a gate driver, a data driver and a driving controller. The gate driver outputs gate signals to the gate lines. The data driver outputs data voltages to the data lines. The driving controller controls the gate driver and the data driver.

When a distance of a pixel from the data driver increases, a propagation delay of the data voltage may increase. When the propagation delay of the data voltage increases, a charging rate of the pixel may be insufficient. An output time of the gate signal may be shifted according to the propagation delay of the data voltage so that the charging rate of the pixel may be compensated.

If the gate shift value for shifting the output time of the gate signal is not accurately determined, the charging rate of the pixel may not be sufficiently compensated so that a display quality of the display panel may be deteriorated.

SUMMARY

Embodiments of the present inventive concept provide a display apparatus determining a gate shift value for delaying a gate signal by considering a compensation image to enhance an accuracy of the gate shift value.

Embodiments of the present inventive concept also provide a method of driving a display panel using the display apparatus.

Embodiments of the present inventive concept also provide a display driving system of the display apparatus.

In an embodiment of a display apparatus according to the present inventive concept, the display apparatus includes a display panel, a driving controller, a gate driver and a data driver. The driving controller is configured to insert a compensation image to first image data including a normal image to generate second image data. The gate driver is configured to shift an output time of a gate signal and to output the gate signal having a shifted output time to the display panel. The data driver is configured to generate a data voltage based on the second image data and to output the data voltage to the display panel. A gate shift amount of a gate signal applied to a gate line for applying the compensation image is substantially the same as a gate shift amount of a gate line disposed immediately before the gate line for applying the compensation image.

In an embodiment, the driving controller may be configured to determine a data counting value only corresponding to the normal image. The gate driver may be configured to shift an output time of the gate signal based on the data counting value.

In an embodiment, the data counting value may be equal to a value obtained by subtracting a second line counting value corresponding to the compensation image from a first line counting value corresponding to the normal images and the compensation images.

In an embodiment, the driving controller may include a compensation image inserter configured to generate the second image data based on the first image data and to add a pulse corresponding to the compensation image to a first data enable signal corresponding to the first image data to generate a second data enable signal corresponding to the second image data.

In an embodiment, the compensation image inserter may be configured to generate a compensation flag corresponding to the compensation image.

In an embodiment, the driving controller may further include a gate shifter configured to determine the data counting value and a compensation counting value corresponding to the compensation image based on the compensation flag and the second data enable signal, to determine a first shift value of the gate signal based on the data counting value and a second shift value of a compensation gate signal based on the compensation counting value, and to output the first shift value and the second shift value to the gate driver.

In an embodiment, the gate shifter may be configured to accumulate active pulses of the second data enable signal to generate the data counting value when the compensation flag has an inactive state.

In an embodiment, the gate shifter may be configured to determine the compensation counting value by multiplying a number of active pulses of the compensation flag by a number of gate lines for simultaneously writing the compensation image.

In an embodiment, the gate driver may be configured to shift the gate signal based on the first shift value, to shift the compensation gate signal based on the second shift value and to output the gate signal and the compensation gate signal to the display panel.

In an embodiment, the driving controller may further include a gate shifter configured to determine a compensation flag corresponding to the compensation image, to determine the data counting value and a compensation counting value corresponding to the compensation image based on the compensation flag and the second data enable signal, to determine a first shift value of the gate signal based on the data counting value and a second shift value of a compensation gate signal based on the compensation counting value, and to output the first shift value and the second shift value to the gate driver.

In an embodiment, the driving controller may be configured to determine a compensation counting value corresponding to the compensation image.

In an embodiment, the gate driver may be configured to shift an output time of a compensation gate signal based on the compensation counting value and to output the compensation gate signal having a shifted output time to the display panel.

In an embodiment, the second image data may include the normal image, a black image having a black grayscale value and a precharge image for precharging a pixel prior to charging the normal image to the pixel.

In an embodiment, a first unit of the first image data may include eight normal images and a second unit of the second image data may include eight normal images, one black image and one precharge image. The first unit and the second unit may have substantially the same time duration.

In an embodiment, the second image data may include the normal image and a black image having a black grayscale value.

In an embodiment, a first unit of the first image data may include eight normal images and a second unit of the second image data may include eight normal images and two black images. The first unit and the second unit may have substantially the same time duration.

In an embodiment, a first unit of the first image data may include eight normal images and a second unit of the second image data may include eight normal images and one black image. The first unit and the second unit may have substantially the same time duration.

In an embodiment of a method of driving a display panel according to the present inventive concept, the method includes inserting a compensation image to first image data including a normal image to generate second image data, shifting an output time of a gate signal, outputting the gate signal having a shifted output time to the display panel, generating a data voltage based on the second image data and outputting the data voltage to the display panel. A gate shift amount of a gate signal applied to a gate line for applying the compensation image may substantially be the same as a gate shift amount of a gate line disposed immediately before the gate line for applying the compensation image.

In an embodiment, the method may further include determining a data counting value corresponding to the normal image. An output time of the gate signal may be shifted based on the data counting value.

In an embodiment, the data counting value may be equal to a value obtained by subtracting a second line counting value corresponding to the compensation image from a first line counting value corresponding to the normal images and the compensation images.

In an embodiment, the method may further include determining a compensation counting value corresponding to the compensation image.

In an embodiment, the method may further include shifting an output time of a compensation gate signal based on the compensation counting value and outputting the compensation gate signal having a shifted output time to the display panel.

In an embodiment of a display apparatus according to the present inventive concept, the display apparatus includes a display panel, a driving controller, a gate driver and a data driver. The driving controller is configured to insert a compensation image to first image data including a normal image to generate second image data. The gate driver is configured to shift an output time of a gate signal and to output the gate signal having a shifted output time to the display panel. The data driver is configured to generate a data voltage based on the second image data and to output the data voltage to the display panel. An L-th compensation image is inserted between an M-th normal image and an M+1-th normal image, a second interval between an M-th gate pulse corresponding to the M-th normal image and an M+1-th gate pulse corresponding to the M+1-th normal image is greater than a first interval between an M−1-th gate pulse corresponding to an M−1-th normal image and the M-th gate pulse corresponding to the M-th normal image. M is a positive integer equal to or greater than two and L is a positive integer.

In an embodiment, when a number of the compensation images inserted between the M-th normal image and the M+1-th normal image is two, the second interval may be three times the first interval.

In an embodiment, when a number of the compensation image inserted between the M-th normal image and the M+1-th normal image is one, the second interval may be twice the first interval.

In an embodiment of a display driving system according to the present inventive concept, the display driving system includes a driving controller, a gate driver and a data driver. The driving controller is configured to insert a compensation image to first image data including a normal image to generate second image data. The gate driver is configured to shift an output time of a gate signal and to output the gate signal having a shifted output time. The data driver is configured to generate a data voltage based on the second image data and to output the data voltage. A gate shift amount of a gate signal applied to a gate line for applying the compensation image is substantially the same as a gate shift amount of a gate line disposed immediately before the gate line for applying the compensation image.

In an embodiment, the driving controller may be configured to determine a data counting value only corresponding to the normal image. The gate driver may be configured to shift an output time of the gate signal based on the data counting value.

In an embodiment, the data counting value may be equal to a value obtained by subtracting a second line counting value corresponding to the compensation image from a first line counting value corresponding to the normal images and the compensation images.

In an embodiment, the driving controller may be configured to determine a compensation counting value corresponding to the compensation image.

In an embodiment, the gate driver may be configured to shift an output time of a compensation gate signal based on the compensation counting value and to output the compensation gate signal having a shifted output time to the display panel.

In an embodiment, the driving controller and the data driver may be integrally formed.

According to the display apparatus, the method of driving the display panel and the display driving system of the display apparatus, the data counting value corresponding to the normal image may be determined and the output time of the gate signal may be determined based on the data counting value. The driving controller may determine the gate shift value by considering the compensation image so that the accuracy of the gate shift value may be enhanced.

The charging rate of the pixel may be compensated using the accurate gate shift value so that the display quality of the display panel may be enhanced.

BRIEF DESCRIPTION OF THE DRAWINGS

The above and other features and advantages of the present inventive concept will become more apparent by describing in detailed embodiments thereof with reference to the accompanying drawings, in which.

DETAILED DESCRIPTION OF THE INVENTIVE CONCEPT

Hereinafter, the present inventive concept will be explained in detail with reference to the accompanying drawings.

Figure 1:
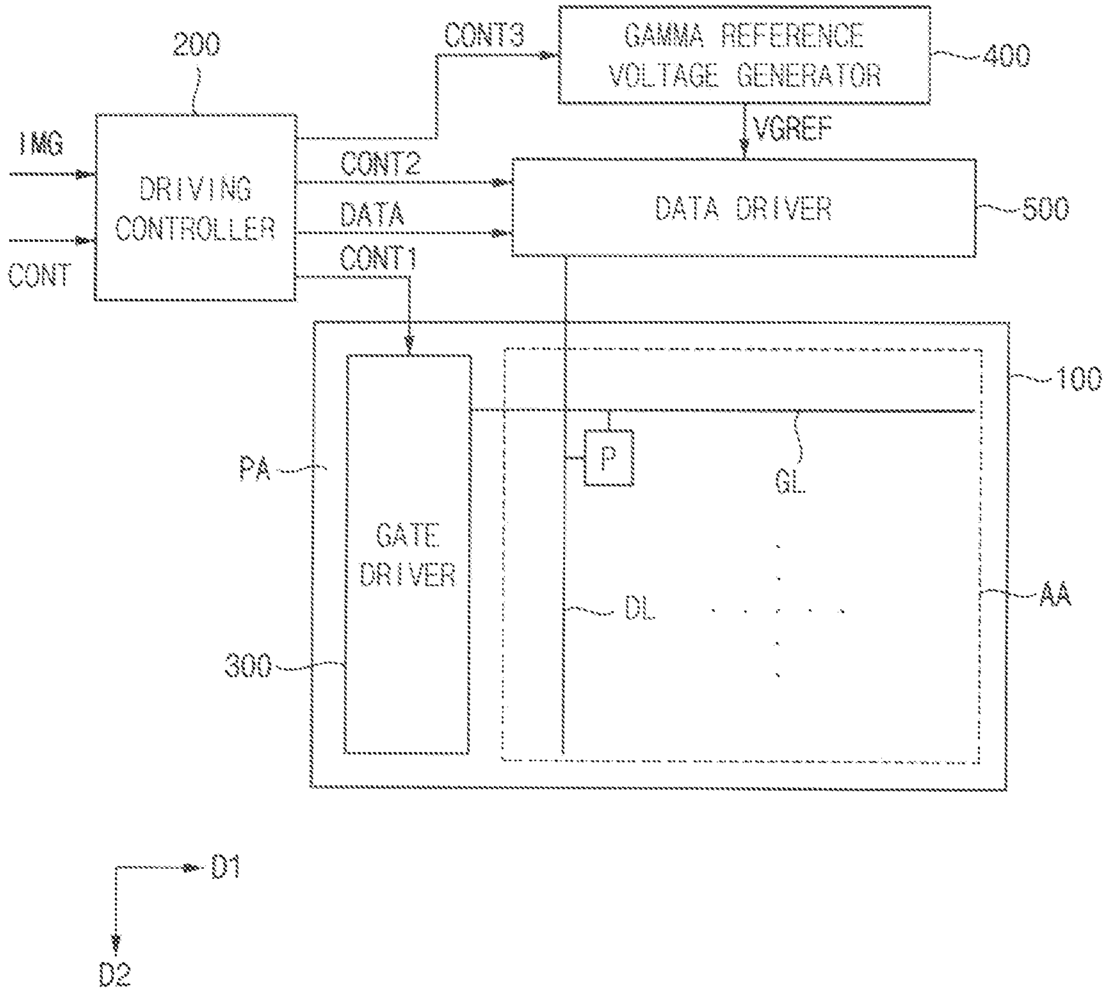
FIG. 1 is a block diagram illustrating a display apparatus according to an embodiment of the present inventive concept.

FIG. 1 is a block diagram illustrating a display apparatus according to an embodiment of the present inventive concept.

Referring to FIG. 1, the display apparatus includes a display panel 100 and a display panel driver (a display driving system). The display panel driver (the display driving system) includes a driving controller 200, a gate driver 300, a gamma reference voltage generator 400 and a data driver 500.

For example, the driving controller 200 and the data driver 500 may be integrally formed. For example, the driving controller 200, the gamma reference voltage generator 400 and the data driver 500 may be integrally formed. A driving module including at least the driving controller 200 and the data driver 500 which are integrally formed may be called a timing controller embedded data driver (TED).

The display panel 100 has a display region AA on which an image is displayed and a peripheral region PA adjacent to the display region AA.

The display panel 100 includes a plurality of gate lines GL, a plurality of data lines DL and a plurality of pixels P connected to the gate lines GL and the data lines DL. The gate lines GL extend in a first direction D1 and the data lines DL extend in a second direction D2 crossing the first direction D1.

The driving controller 200 receives input image data IMG and an input control signal CONT from an external apparatus. The input image data IMG may further include red image data, green image data and blue image data. The input image data IMG may include white image data. The input image data IMG may include magenta image data, yellow image data and cyan image data. The input control signal CONT may include a master clock signal and a data enable signal. The input control signal CONT may further include a vertical synchronizing signal and a horizontal synchronizing signal.

The driving controller 200 generates a first control signal CONT1, a second control signal CONT2, a third control signal CONT3 and a data signal DATA based on the input image data IMG and the input control signal CONT.

The driving controller 200 generates the first control signal CONT1 for controlling an operation of the gate driver 300 based on the input control signal CONT and outputs the first control signal CONT1 to the gate driver 300. The first control signal CONT1 may include a vertical start signal and a gate clock signal.

The driving controller 200 generates the second control signal CONT2 for controlling an operation of the data driver 500 based on the input control signal CONT and outputs the second control signal CONT2 to the data driver 500. The second control signal CONT2 may include a horizontal start signal and a load signal.

The driving controller 200 generates the data signal DATA based on the input image data IMG. The driving controller 200 outputs the data signal DATA to the data driver 500.

The driving controller 200 generates the third control signal CONT3 for controlling an operation of the gamma reference voltage generator 400 based on the input control signal CONT and outputs the third control signal CONT3 to the gamma reference voltage generator 400.

A structure and an operation of the driving controller 200 are explained referring to FIGS. 2 to 11 in detail.

The gate driver 300 generates gate signals driving the gate lines GL in response to the first control signal CONT1 received from the driving controller 200. The gate driver 300 outputs the gate signals to the gate lines GL. For example, the gate driver 300 may sequentially output the gate signals to the gate lines GL. The gate driver 300 may be mounted on the peripheral region PA of the display panel 100. The gate driver 300 may be integrated on the peripheral region PA of the display panel 100.

The gamma reference voltage generator 400 generates a gamma reference voltage VGREF in response to the third control signal CONT3 received from the driving controller 200. The gamma reference voltage generator 400 provides the gamma reference voltage VGREF to the data driver 500. The gamma reference voltage VGREF has a value corresponding to a level of the data signal DATA.

In an embodiment, the gamma reference voltage generator 400 may be disposed in the driving controller 200 or in the data driver 500.

The data driver 500 receives the second control signal CONT2 and the data signal DATA from the driving controller 200, and receives the gamma reference voltages VGREF from the gamma reference voltage generator 400. The data driver 500 converts the data signal DATA into data voltages having an analog type using the gamma reference voltages VGREF. The data driver 500 outputs the data voltages to the data lines DL.

Figure 2:
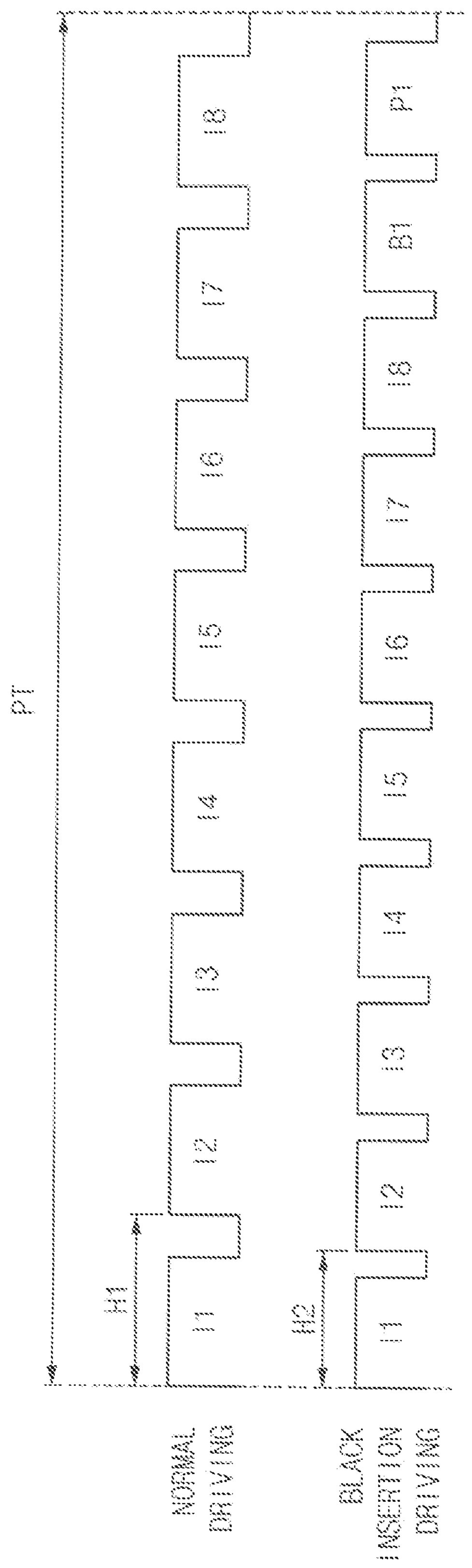
FIG. 2 is a conceptual diagram illustrating a driving controller of FIG. 1.

FIG. 2 is a conceptual diagram illustrating the driving controller 200 of FIG. 1.

Referring to FIGS. 1 and 2, first image data include a normal image. The driving controller 200 may insert a compensation image to the first image data to generate second image data. For example, an upper portion of FIG. 2 represents the first image data including the normal images I1 to I8. A lower portion of FIG. 2 represents the second image data including the normal images I1 to I8 and the inserted compensation images B1 and P1. In a normal driving method, an image may be displayed using the first image data. In a black insertion driving method, an image may be displayed using the second image data.

The second image data may include the normal images I1 to I8, a black image B1 having a black grayscale value and a precharge image P1 for precharging the pixel prior to charging the normal image to the pixel.

When the display panel 100 is driven in the normal driving method using the first image data, the black image may not be inserted into the image data so that the data signal processed by the driving controller 200 may include only normal images I1 to I8 as shown in the upper portion of FIG. 2.

When the display panel 100 is driven in the black insertion driving method using the second image data, the black image may be inserted into the image data so that the data signal processed by the driving controller 200 may include the normal images I1 to I8 and the black image B1 as shown in the lower portion of FIG. 2. In addition, according to an embodiment, the data signal processed by the driving controller 200 may include the normal images I1 to I8, the black image B1 and the precharge image P1 as shown in the lower portion of FIG. 2.

For example, a first unit of the first image data may include eight normal images I1 to I8 and a second unit of the second image data may include eight normal images I1 to I8, one black image B1 and one precharge image P1. Herein, the first unit and the second unit may have the same time duration PT. Thus, a second horizontal period H2 of the second image data may be shorter than a first horizontal period H1 of the first image data.

Figure 3:
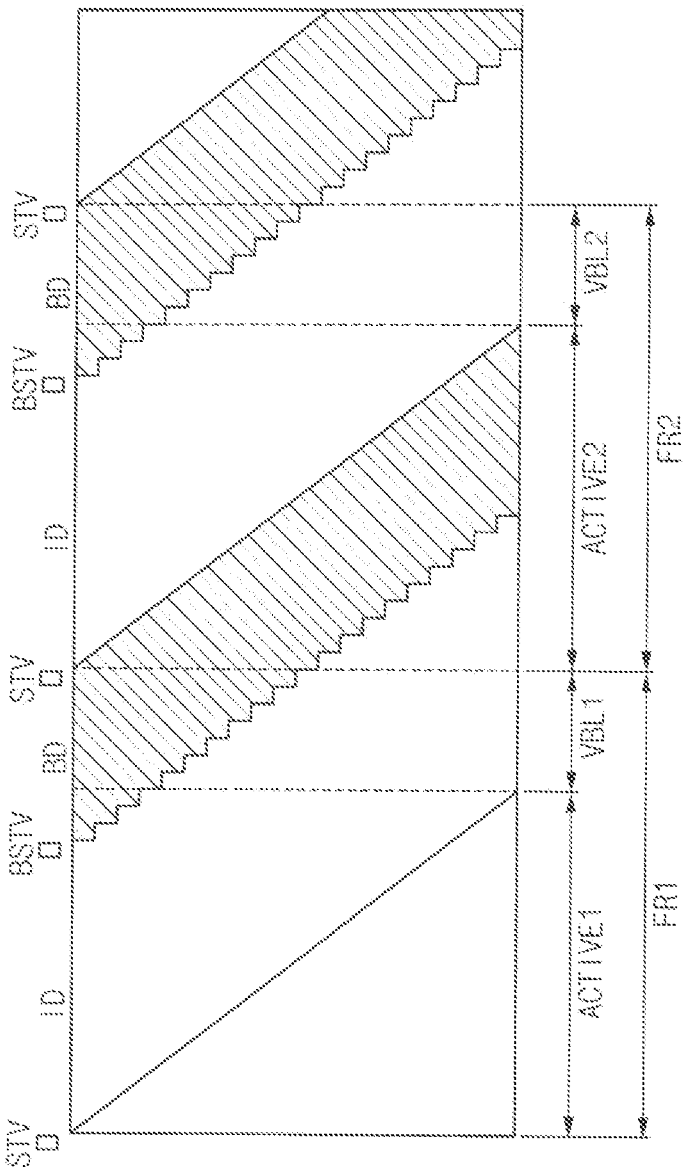
FIG. 3 is a conceptual diagram illustrating a driving timing of the display apparatus of FIG. 1.
Figure 4:
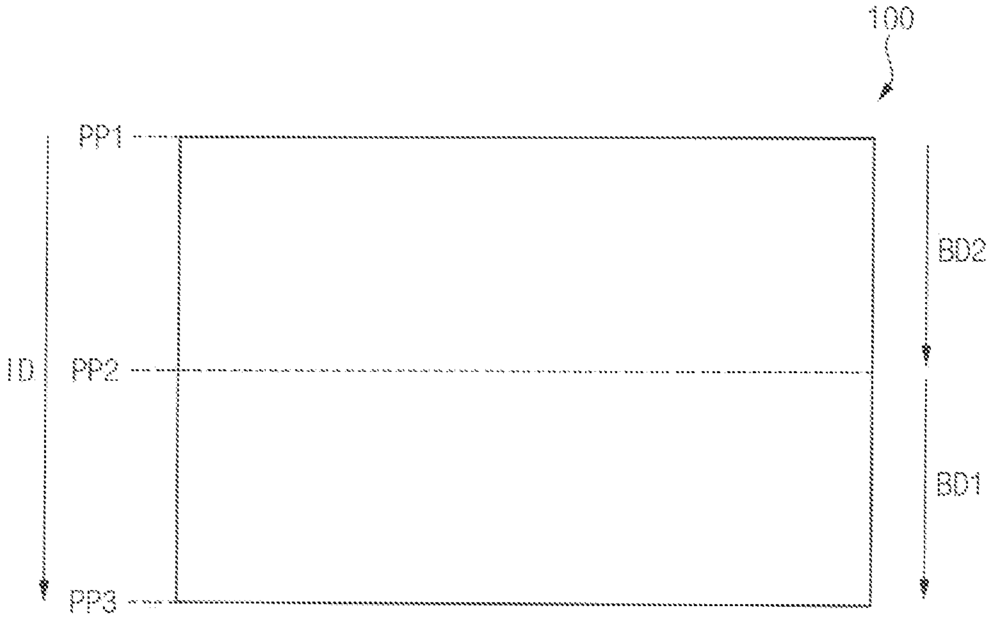
FIG. 4 is a conceptual diagram illustrating a normal image driving timing and a black image driving timing of the display apparatus of FIG. 1.

FIG. 3 is a conceptual diagram illustrating a driving timing of the display apparatus of FIG. 1. FIG. 4 is a conceptual diagram illustrating a normal image driving timing and a black image driving timing of the display apparatus of FIG. 1.

Referring to FIGS. 1 to 4, the display panel 100 may be driven in a unit of a frame. A first frame FR1 may include a first active period ACTIVE1 and a first vertical blank period VBL1. A second frame FR2 may include a second active period ACTIVE1 and a second vertical blank period VBL2.

When a vertical start signal STV is applied to the gate driver 300, the gate driver 300 may output the gate signal from an upper portion of the display panel 100.

When a compensation vertical blank signal BSTV is applied to the gate driver 300, the gate driver 300 may output compensation gate signal from the upper portion of the display panel 100.

When the gate signal is applied to the display panel 100, a normal data voltage corresponding to the normal image may be applied to a target pixel of the display panel 100. In addition, when the compensation gate signal is applied to the display panel 100, a compensation data voltage corresponding to the compensation image (e.g. the black image) may be applied to a target pixel of the display panel 100.

The gate signal may turn on switching transistors connected to one gate line. In contrast, the compensation gate signal may turn on switching transistors connected to plural gate lines simultaneously. For example, the compensation gate signal may turn on switching transistors connected to eight gate lines simultaneously.

Assume that a specific pixel in the display panel 100 is a first pixel. The normal data voltage may be applied to the first pixel in the first frame FR1 and the compensation data voltage may be applied to the first pixel after a specific time elapses since the normal data voltage is applied to the first pixel within the first frame FR1.

As shown in FIG. 4, the normal gate signals are applied to the display panel 100 sequentially from a first portion PP1 of the display panel 100 to a third portion PP3 of the display panel 100 through a second portion PP2 of the display panel 100. For example, at a start time point of the first frame FR1, when the normal gate signal is applied to the first portion PP1 of the display panel 100, the compensation gate signal may be applied to the second portion PP2 of the display panel 100. During a time when the normal gate signal is sequentially applied from the first portion PP1 to the third portion PP3, the compensation gate signal may be sequentially applied from the second portion PP2 to the third portion PP3 and from the first portion PP1 to the second portion PP2.

Figure 5:
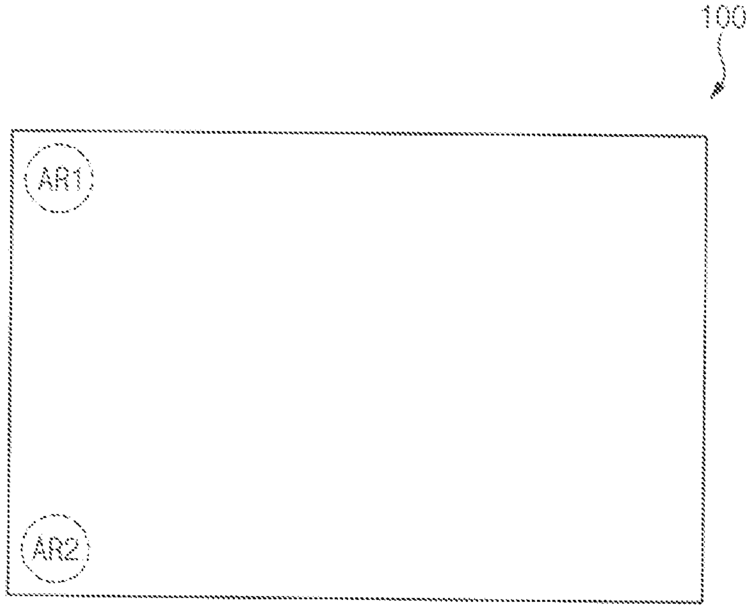
FIG. 5 is a conceptual diagram illustrating a first area and a second area of a display panel of FIG. 1.
Figure 6A:
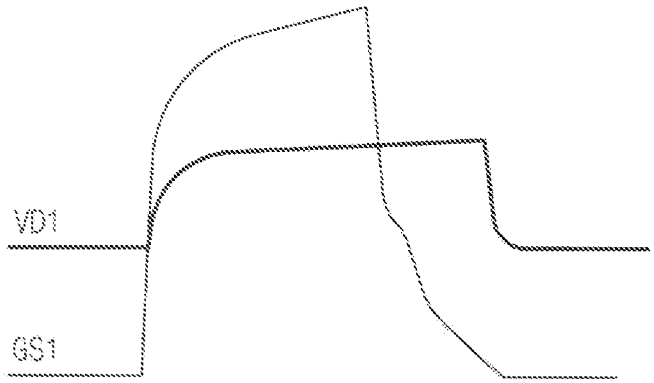
FIG. 6A is a timing diagram illustrating a gate signal and a data voltage applied to a pixel of the first area of FIG. 5 when the display apparatus of FIG. 1 does not operate a gate shift driving.
Figure 6B:
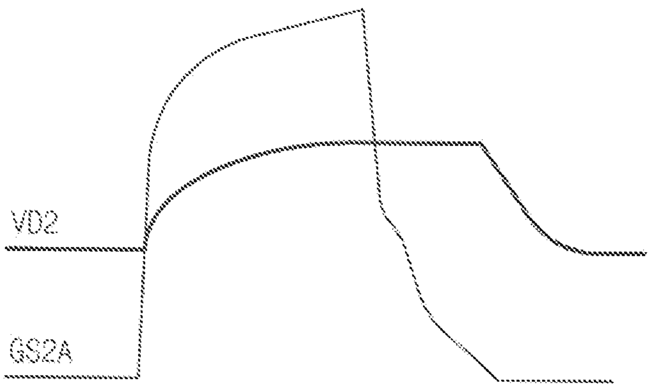
FIG. 6B is a timing diagram illustrating a gate signal and a data voltage applied to a pixel of the second area of FIG. 5 when the display apparatus of FIG. 1 does not operate the gate shift driving.

FIG. 5 is a conceptual diagram illustrating a first area AR1 and a second area AR2 of the display panel 100 of FIG. 1. FIG. 6A is a timing diagram illustrating a gate signal and a data voltage applied to a pixel of the first area of FIG. 5 when the display apparatus of FIG. 1 does not operate a gate shift driving. FIG. 6B is a timing diagram illustrating a gate signal and a data voltage applied to a pixel of the second area of FIG. 5 when the display apparatus of FIG. 1 does not operate the gate shift driving.

In FIG. 5, it is assumed that the data driver 500 is disposed close to the first area AR1 and disposed farther from the second area AR2.

As shown in FIG. 6A, the first area AR1 is close to the data driver 500 so that a delay of the data voltage VD1 applied to the first area AR1 may be little.

Thus, when the gate signal GS1 and the data voltage VD1 are applied to the pixel in the first area AR1, a charging rate of the data voltage VD1 may be great. For example, GS1 may mean a gate signal applied to a first gate line.

In contrast, as shown in FIG. 6B, the second area AR2 is far from the data driver 500 so that a delay of the data voltage VD2 applied to the second area AR1 may be relatively great.

In FIG. 6B, the display apparatus does not adopt the gate shift driving so that a gate signal GS2A applied to a pixel in the second area AR2 and the gate signal GS1 applied to the pixel in the first area AR1 may have the same timing with respect to the data voltage VD2 and the data voltage VD1, respectively. Thus, when the gate signal GS2A and the data voltage VD2 are applied to the pixel in the second area AR2, a charging rate of the data voltage VD2 may be relatively decreased because of an attenuation of the data voltage VD2. For example, GS2A may mean a gate signal applied to a last gate line.

Figure 7A:
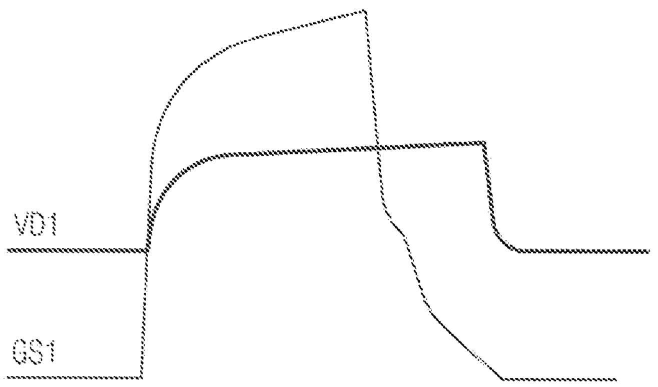
FIG. 7A is a timing diagram illustrating a gate signal and a data voltage applied to the pixel of the first area of FIG. 5 when the display apparatus of FIG. 1 operates the gate shift driving.
Figure 7B:
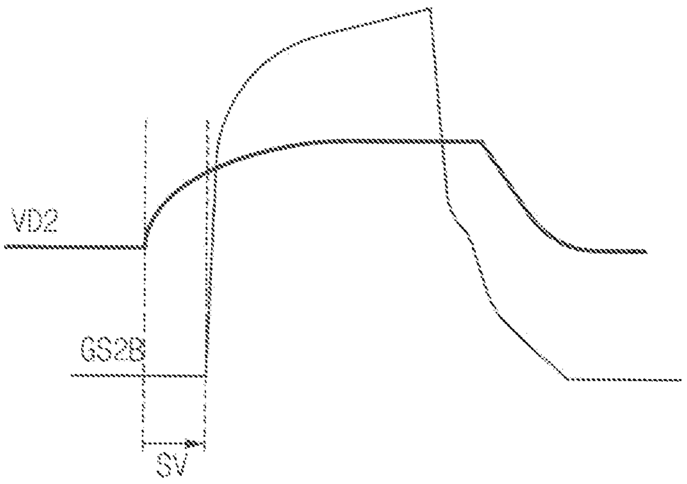
FIG. 7B is a timing diagram illustrating a gate signal and a data voltage applied to the pixel of the second area of FIG. 5 when the display apparatus of FIG. 1 operates the gate shift driving.

FIG. 7A is a timing diagram illustrating a gate signal and a data voltage applied to the pixel of the first area of FIG. 5 when the display apparatus of FIG. 1 adopts the gate shift driving. FIG. 7B is a timing diagram illustrating a gate signal and a data voltage applied to the pixel of the second area of FIG. 5 when the display apparatus of FIG. 1 adopts the gate shift driving.

As shown in FIG. 7A, the first area AR1 is close to the data driver 500 so that a delay (an attenuation) of the data voltage VD1 applied to the first area AR1 may be little.

Thus, when the gate signal GS1 and the data voltage VD1 are applied to the pixel in the first area AR1, a charging rate of the data voltage VD1 may be great. For example, GS1 may mean a gate signal applied to a first gate line.

In contrast, as shown in FIG. 7B, the second area AR2 is far from the data driver 500 so that a delay of the data voltage VD2 applied to the second area AR1 may be relatively great.

In FIG. 7B, the display apparatus adopts the gate shift driving so that a gate signal GS2B in FIG. 6B applied to a pixel in the second area AR2 may be delayed by a gate shift value SV compared to the gate signal GS1 in FIG. 7A applied to the pixel in the first area AR1. Thus, when the gate signal GS2B and the data voltage VD2 are applied to the pixel in the second area AR2, a charging rate of the data voltage VD2 may be improved. For example, GS2B may mean a gate signal applied to a last gate line.

Figure 8:
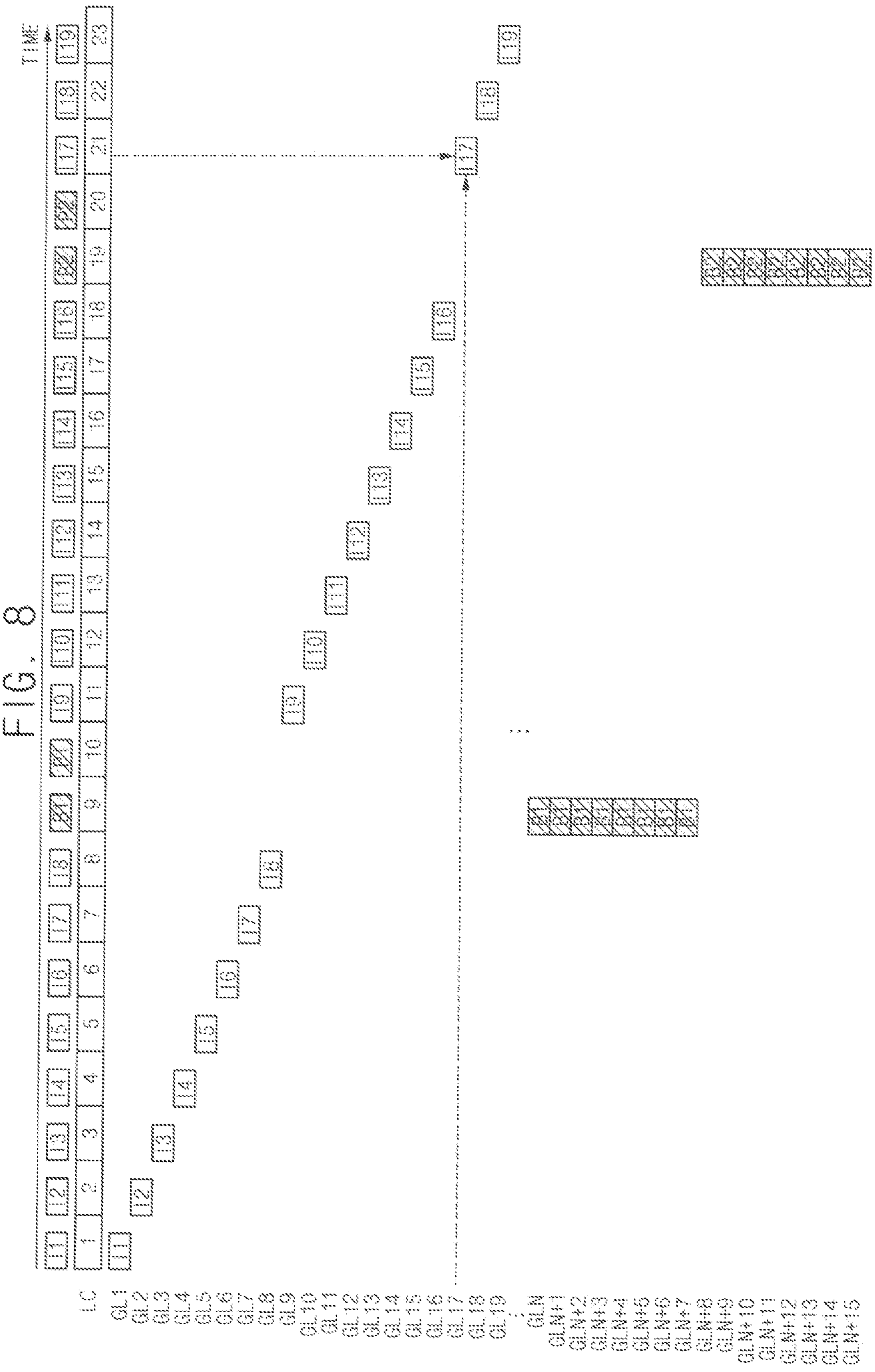
FIG. 8 is a conceptual diagram illustrating a driving timing and a line counting value of the display apparatus of FIG. 1.

FIG. 8 is a conceptual diagram illustrating a driving timing and a line counting value LC of the display apparatus of FIG. 1.

Referring to FIGS. 1 to 8, the line counting value LC may correspond to the normal images I1 to I8, I9 to I16 and I17 to I19 and the compensation image B1, P1, B2 and P2. For example, the line counting value LC may mean a sum of a number of pulses of data enable signals corresponding to the normal images I1 to I8, I9 to I16 and I17 to I19 and a number of pulses of data enable signals corresponding to the compensation image B1, P1, B2 and P2.

In FIG. 8, for example, nineteen normal images I1 to I8, I9 to I16 and I17 to I19 are sequentially applied to pixels connected to first to nineteenth gate lines GL1 to GL19, a first black image B1 is simultaneously applied to pixels connected to N-th to N+7-th gate lines GLN to GLN+7 and a second black image B2 is simultaneously applied to pixels connected to N+8-th to N+15-th gate lines GLN+8 to GLN+15.

For example, the first to eighth normal images I1 to I8 may be sequentially applied to the pixels connected to the first to eighth gate lines GL1 to GL8. Before the ninth normal image I9 is applied to the pixels connected to the ninth gate line GL9, the first black image B1 may be simultaneously applied to the pixels connected to the N-th to N+7-th gate lines GLN to GLN+7.

The first image I1 is image data applied to a pixel connected to the first gate line GL1. The second image I2 is image data applied to a pixel connected to the second gate line GL2. The third image I3 is image data applied to a pixel connected to the third gate line GL3. The fourth image I4 is image data applied to a pixel connected to the fourth gate line GL4. The fifth image I5 is image data applied to a pixel connected to the fifth gate line GL5. The sixth image I6 is image data applied to a pixel connected to the sixth gate line GL6. The seventh image I7 is image data applied to a pixel connected to the seventh gate line GL7. The eighth image I8 is image data applied to a pixel connected to the eighth gate line GL8.

After the first black image B1 is simultaneously applied to the pixels connected to the N-th to N+7-th gate lines GLN to GLN+7, the ninth to sixteenth normal images I9 to I16 may be sequentially applied to the pixels connected to the ninth to sixteenth gate lines GL9 to GL16. Before the seventeenth normal image I17 is applied to the pixels connected to the seventeenth gate line GL17, the second black image B2 may be simultaneously applied to the pixels connected to the N+8-th to N+15-th gate lines GLN+8 to GLN+15.

The ninth image I9 is image data applied to a pixel connected to the ninth gate line GL9. The tenth image I10 is image data applied to a pixel connected to the tenth gate line GL10.

As shown in FIG. 8, when the seventeenth normal image I17 is applied to the seventeenth gate line GL17, the line counting value LC may indicate twenty one because the first black image B1, the first precharge image P1, the second black image B2 and the second precharge image P2 are inserted between the first image I1 and the seventeen images I17.

The degree of the gate shift for the pixels connected to the seventeenth gate line GL17 is preferably a value corresponding to seventeen lines. However, if the gate shift value SV is generated based on twenty one, which is the line counting value LC, the degree of the gate shift may be different from a desired degree of the gate shift. Herein, the degree of the gate shift may be decided correspond to a distance from the data driver 500 to the pixel in the second direction D2. When the degree of the gate shift is seventeen, it means that the distance from the data driver 500 to the pixel in the second direction D2 may correspond to a position of the seventeenth gate line GL17. When the degree of the gate shift is twenty one, it means that the distance from the data driver 500 to the pixel in the second direction D2 may correspond to a position of the twenty first gate line GL21.

Thus, in the present embodiment, the driving controller 200 may determine a data counting value which corresponds to the normal images I1 to I17. Herein, when the seventeenth image I17 is applied to the seventeenth gate line GL17, the data counting value may indicate seventeen.

The data counting value may be equal to a value obtained by subtracting the line counting value corresponding to the compensation images B1, P1, B2 and P2 from the line counting value corresponding to the normal images I1 to I19 and the compensation images B1, P1, B2 and P2.

For example, when the line counting value corresponding to the normal images and the compensation images is P and the data counting value is Q and the line counting value corresponding to the compensation images is R, an equation, $Q=P-R$, may be satisfied. Herein, P, Q and R are positive integers.

Figure 9:
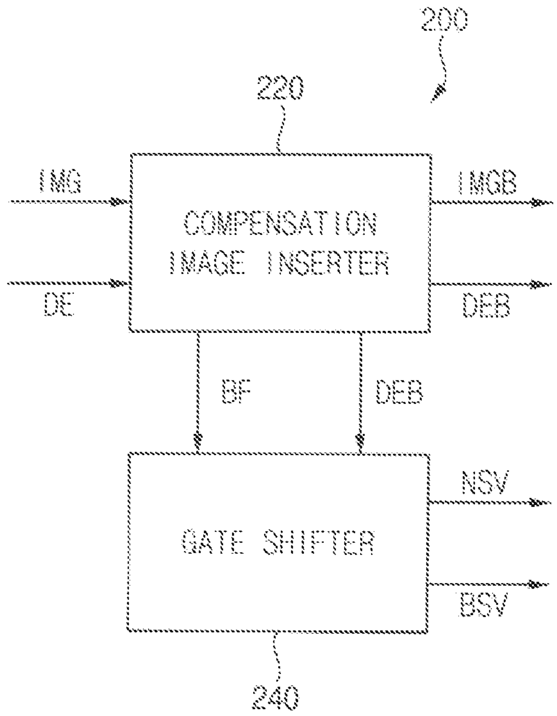
FIG. 9 is a block diagram illustrating a driving controller of FIG. 1.
Figure 10:
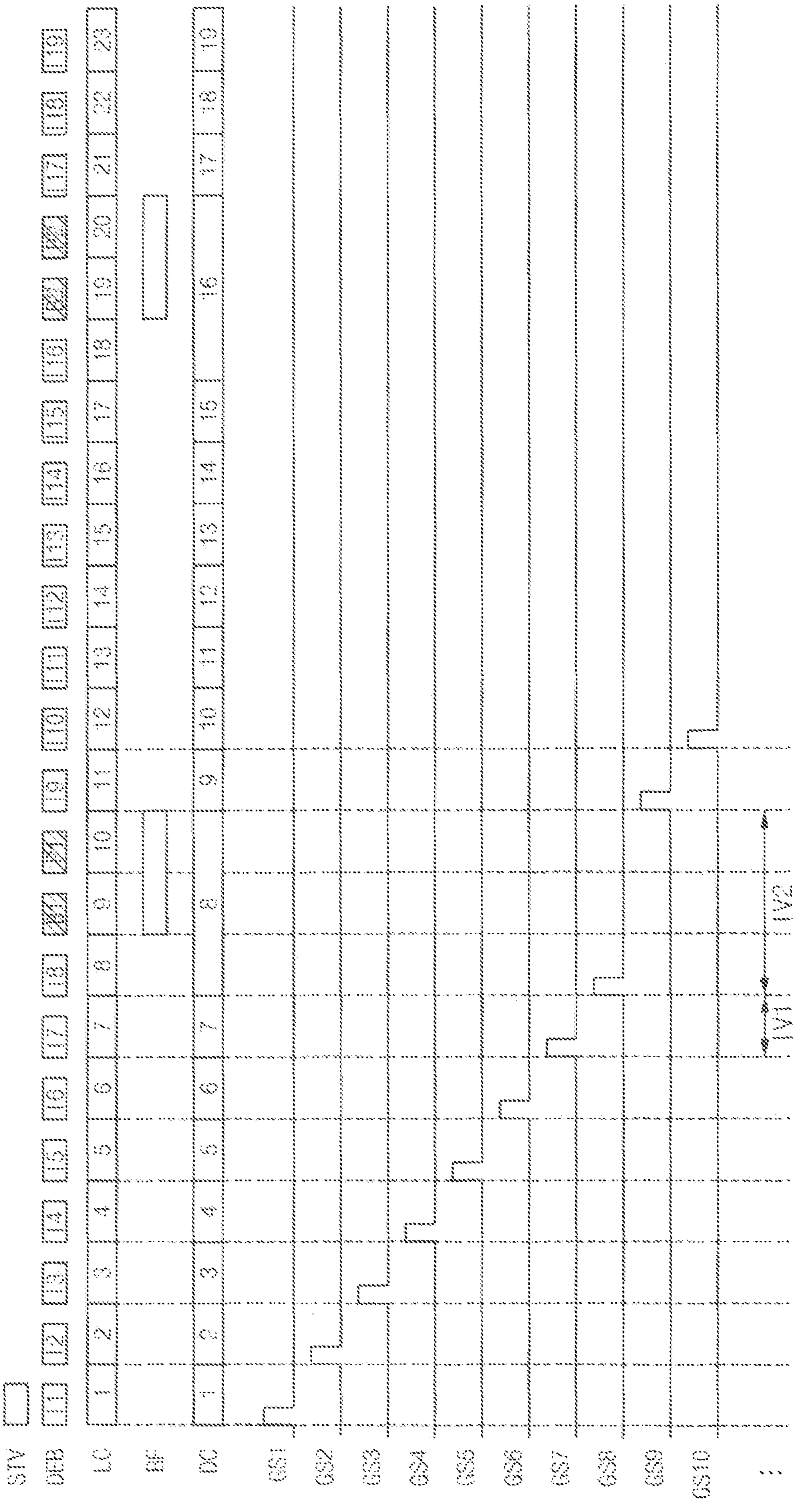
FIG. 10 is a conceptual diagram illustrating a method of determining a data counting value by a gate shifter of FIG. 9.
Figure 11:
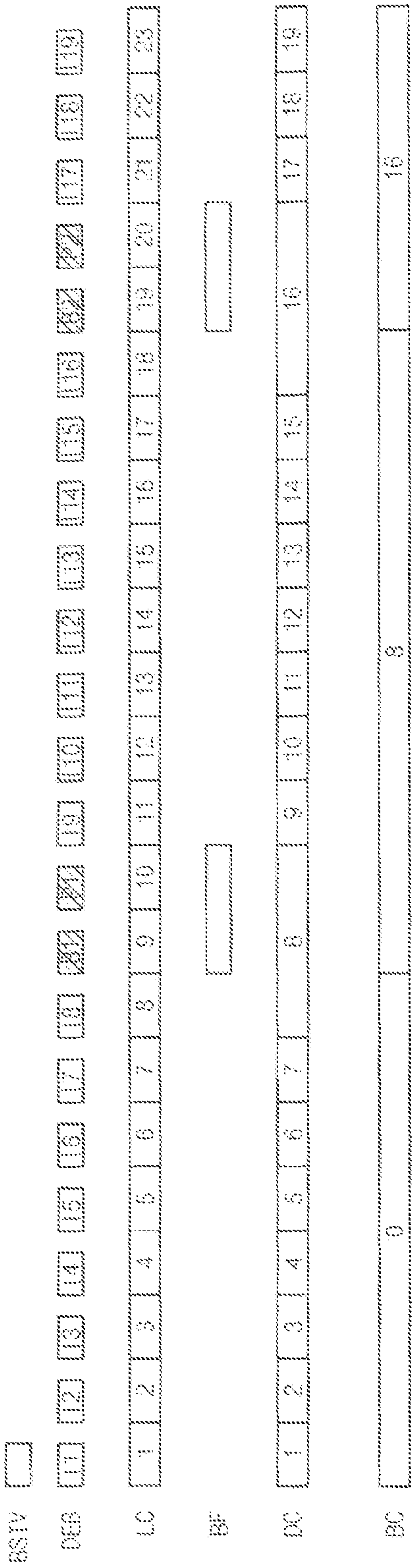
FIG. 11 is a conceptual diagram illustrating a method of determining a compensation counting value by the gate shifter of FIG. 9.
Figure 12:
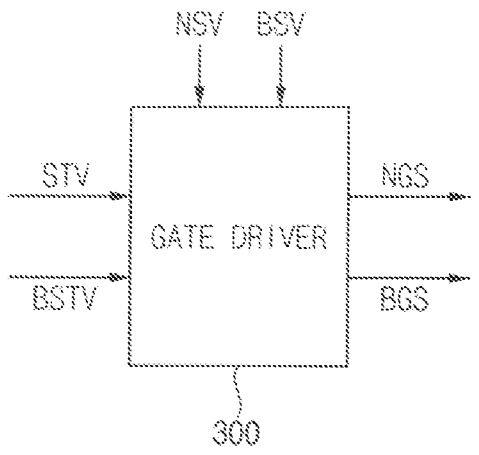
FIG. 12 is a block diagram illustrating an operation of a gate driver of FIG. 1.

FIG. 9 is a block diagram illustrating the driving controller 200 of FIG. 1. FIG. 10 is a conceptual diagram illustrating a method of determining the data counting value by a gate shifter 240 of FIG. 9. FIG. 11 is a conceptual diagram illustrating a method of determining a compensation counting value BC by the gate shifter 240 of FIG. 9. FIG. 12 is a block diagram illustrating an operation of the gate driver 300 of FIG. 1.

Referring to FIGS. 1 to 12, the driving controller 200 may insert the compensation image to the first image data IMG including the normal images to generate the second image data IMGB. The driving controller 200 may determine the data counting value DC corresponding to the normal images up to a present time point in a sequential driving of the normal images. Herein, the data counting value DC may be a value counted only for the normal images up to the present time point and excluding a value counted for the compensation images (e.g. the black images and the precharge images).

The gate driver 300 may shift the output time of the gate signal based on the data counting value DC and output the gate signal having the shifted output time to the display panel 100. A waveform of the gate signal having the shifted output time may be same as shown in FIG. 7B.

As explained above, the compensation image may not affect the data counting value DC. Thus, a gate shift amount for the compensation image may be the same as a gate shift amount immediately before the compensation image. The gate driver 300 of the present embodiment may shift the output time of the gate signal by the gate shift amount corresponding to the number of accumulated horizontal periods when the normal images are applied.

The data driver 500 may generate the data voltage based on the second image data IMGB and may output the data voltage to the display panel 100.

In addition, the driving controller 200 may determine the compensation counting value BC corresponding to the compensation images.

The gate driver 300 may shift the output time of the compensation gate signal based on the compensation counting value BC and output the compensation gate signal having the shifted output time to the display panel 100.

The driving controller 200 may include a compensation image inserter 220 and a gate shifter 240.

The compensation image inserter 220 may generate the second image data IMGB based on the first image data IMG and may add pulses corresponding to the compensation images to a first data enable signal DE corresponding to the first image data IMG to generate a second data enable signal DEB corresponding to the second image data IMGB.

In the present embodiment, the compensation image inserter 220 may generate a compensation flag BF corresponding to the compensation image.

The compensation image inserter 220 may output the second data enable signal DEB and the compensation flag BF to the gate shifter 240.

The gate shifter 240 may determine the data counting value DC corresponding to the normal images and the compensation counting value BC corresponding to the compensation images based on the compensation flag BF and the second data enable signal DEB.

The gate shifter 240 may determine a first shift value NSV of the gate signal based on the data counting value DC and a second shift value BSV of the compensation gate signal based on the compensation counting value BC. The gate shifter 240 may output the first shift value NSV and the second shift value BSV to the gate driver 300.

The gate shifter 240 may receive a parameter related to a black insertion driving. The parameter may include a number of normal images which are continuously inputted, a number of compensation images corresponding to the normal images which are continuously inputted and a number of gate lines for simultaneously writing the compensation image. For example, in FIG. 2, the number of normal images which are continuously inputted may be eight, the number of compensation images corresponding to the normal images which are continuously inputted may be two and the number of gate lines for simultaneously writing the compensation image may be eight.

In FIG. 10, the gate shifter 240 may accumulate active pulses of the second data enable signal DEB to generate the data counting value DC when the compensation flag BF has an inactive state. The data counting value DC may correspond to the number of the accumulated horizontal periods when the normal images are applied.

In FIG. 10, although the line counting value LC increases to nine and ten in the compensation images B1 and P1, respectively, the compensation flag BF is activated in the compensation images B1 and P1 so that the data counting value DC in the compensation images B1 and P1 may maintain eight in the compensation images B1 and P1. At I9, the compensation flag BF is deactivated so that the data counting value DC may increase to nine. At I9, the line counting value LC which does not distinguish the normal image and the compensation image may be eleven.

In FIG. 10, a first gate pulse of the first gate signal GS1 corresponds to the first normal image I1, a second gate pulse of the second gate signal GS2 corresponds to the second normal image I2, a third gate pulse of the third gate signal GS3 corresponds to the third normal image I3, a fourth gate pulse of the fourth gate signal GS4 corresponds to the fourth normal image I4, a fifth gate pulse of the fifth gate signal GS5 corresponds to the fifth normal image I5, a sixth gate pulse of the sixth gate signal GS6 corresponds to the sixth normal image I6, a seventh gate pulse of the seventh gate signal GS7 corresponds to the seventh normal image I7 and an eighth gate pulse of the eighth gate signal GS8 corresponds to the eighth normal image I8. Herein, the first to eighth gate signals GS1 to GS8 may be respectively applied to the first to eighth gate lines GL1 to GL8 in FIG. 8.

For example, two compensation images B1 and P1 may be inserted between the eighth normal image I8 and the ninth normal image I9. As explained referring to FIG. 8, the gate signal corresponding to the first compensation image B1 may not be applied to the ninth gate signal GL9 but may be applied to other gate lines (e.g. GLN) disposed at other positions in the display panel 100.

A ninth gate pulse of the ninth gate signal GS9 corresponds to the ninth normal image I9 and a tenth gate pulse of the tenth gate signal GS10 corresponds to the tenth normal image I10.

As shown in FIG. 10, when the compensation images (e.g. B1 and P1) are inserted between the eighth normal image I8 and the ninth normal image I9, a second interval IV2 between the eighth gate pulse corresponding to the eighth normal image I8 and the ninth gate pulse corresponding to the ninth normal image I9 may be greater than a first interval IV1 between the seventh gate pulse corresponding to the seventh normal image I7 and the eighth gate pulse corresponding to the eighth normal image I8.

For example, when the number of the compensation images is two (e.g. B1 and P1 in FIG. 10), the second interval IV2 may be three times the first interval IV1.

Alternatively, for example, when the number of the compensation image is one (e.g. B1 in FIG. 15), the second interval IV2 may be twice the first interval IV1.

In the present embodiment, the compensation image may be inserted for every predetermined number of the normal images. Although the predetermined number of the normal images is eight in the present embodiment, the present inventive concept may not be limited thereto.

The gate shift amount may not have a different value for every gate line. A predetermined number or more of adjacent gate lines may have the same gate shift amount. For example, hundred adjacent gate lines may have the same gate shift amount. In FIG. 10, for example, the first to tenth gate signals GS1 to GS10 may have the same gate shift amount.

As shown in FIG. 11, the gate shifter 240 may determine the compensation counting value BC by multiplying the number of active pulses of the compensation flag BF by the number of gate lines for simultaneously writing the compensation image.

When the number of active pulses of the compensation flag BF is X, the number of gate lines for simultaneously writing the compensation image is Y, the compensation counting value BC may be Z which is X×Y (Z=X×Y). Herein, X, Y and Z may be positive integers.

In FIG. 11, at a time point (LC=9) when a first compensation flag BF is activated, the compensation counting value BC may be eight. At a time point (LC=19) when a second compensation flag BF is activated, the compensation counting value BC may be sixteen.

As shown in FIG. 12, the gate driver 300 may shift the gate signal NGS based on the first shift value NSV and output the gate signal NGS to the display panel 100. The gate driver 300 may shift the compensation gate signal BGS based on the second shift value BSV and output the compensation gate signal BGS to the display panel 100.

According to the present embodiment, the data counting value DC corresponding to the normal images may be determined and the output time of the gate signal may be determined based on the data counting value DC. The driving controller 200 may determine the gate shift value SV by considering the compensation image so that the accuracy of the gate shift value SV may be enhanced.

The charging rate of the pixel may be compensated using the accurate gate shift value SV so that the display quality of the display panel 100 may be enhanced.

Figure 13:
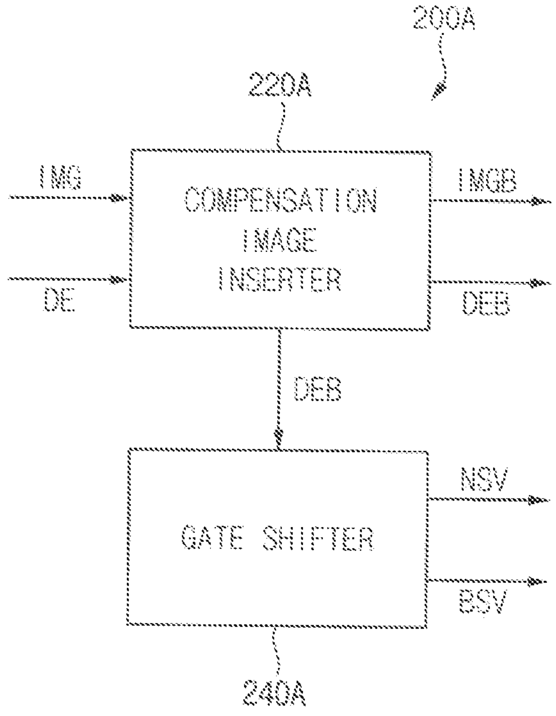
FIG. 13 is a block diagram illustrating a driving controller of a display apparatus according to an embodiment of the present inventive concept.

FIG. 13 is a block diagram illustrating a driving controller of a display apparatus according to an embodiment of the present inventive concept.

The display apparatus and the method of driving the display panel according to the present embodiment is substantially the same as the display apparatus and the method of driving the display panel of the previous embodiment explained referring to FIGS. 1 to 12 except for the structure and the operation of the driving controller. Thus, the same reference numerals will be used to refer to the same or like parts as those described in the previous embodiment of FIGS. 1 to 12 and any repetitive explanation concerning the above elements will be omitted.

Referring to FIGS. 1 to 8 and 10 to 13, the display apparatus includes a display panel 100 and a display panel driver (a display driving system). The display panel driver (the display driving system) includes a driving controller 200A, a gate driver 300, a gamma reference voltage generator 400 and a data driver 500.

The driving controller 200A may insert the compensation image to the first image data IMG including the normal images to generate the second image data IMGB. The driving controller 200A may determine the data counting value DC corresponding to the normal images.

The gate driver 300 may shift the output time of the gate signal based on the data counting value DC and output the gate signal having the shifted output time to the display panel 100.

The data driver 500 may generate the data voltage based on the second image data IMGB and may output the data voltage to the display panel 100.

In addition, the driving controller 200A may determine the compensation counting value BC corresponding to the compensation images.

The gate driver 300 may shift the output time of the compensation gate signal based on the compensation counting value BC and output the compensation gate signal having the shifted output time to the display panel 100.

The driving controller 200A may include a compensation image inserter 220A and a gate shifter 240A.

The compensation image inserter 220A may generate the second image data IMGB based on the first image data IMG and may add pulses corresponding to the compensation image to a first data enable signal DE corresponding to the first image data IMG to generate a second data enable signal DEB corresponding to the second image data IMGB. The compensation image inserter 220A may output the second data enable signal DEB to the gate shifter 240A.

In the present embodiment, the gate shifter 240A may generate a compensation flag BF corresponding to the compensation image. The gate shifter 240A may determine the data counting value DC corresponding to the normal images and the compensation counting value BC corresponding to the compensation images based on the compensation flag BF and the second data enable signal DEB.

The gate shifter 240A may determine a first shift value NSV of the gate signal based on the data counting value DC and a second shift value BSV of the compensation gate signal based on the compensation counting value BC. The gate shifter 240A may output the first shift value NSV and the second shift value BSV to the gate driver 300.

According to the present embodiment, the data counting value DC corresponding to the normal images may be determined and the output time of the gate signal may be determined based on the data counting value DC. The driving controller 200A may determine the gate shift value SV by considering the compensation image so that the accuracy of the gate shift value SV may be enhanced.

The charging rate of the pixel may be compensated using the accurate gate shift value SV so that the display quality of the display panel 100 may be enhanced.

Figure 14:
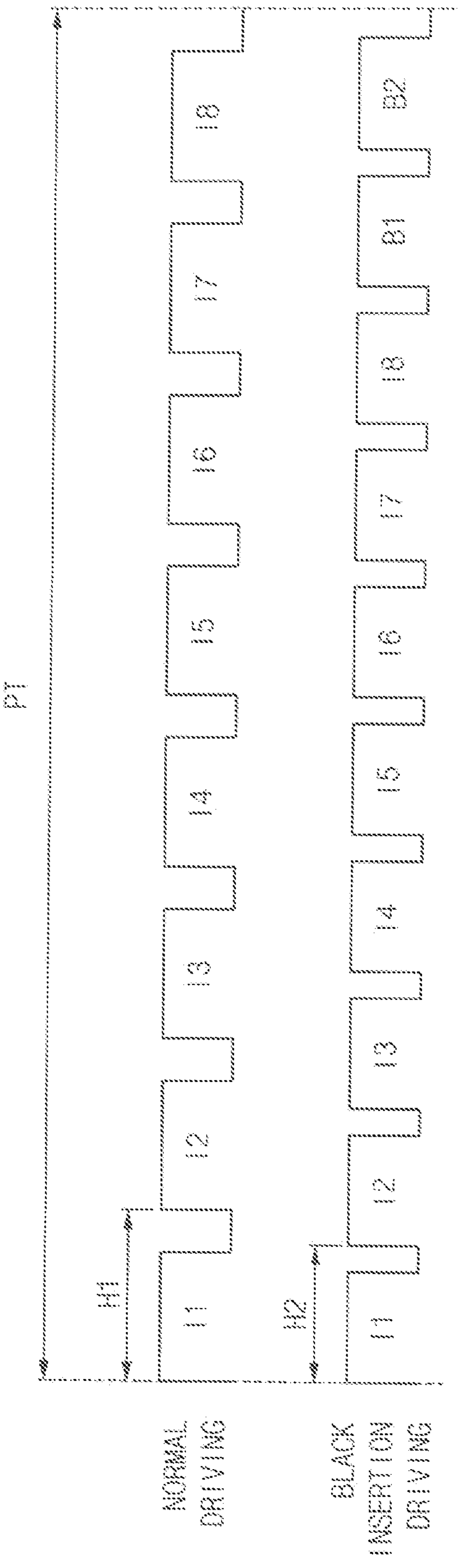
FIG. 14 is a conceptual diagram illustrating an operation of a driving controller of a display apparatus according to an embodiment of the present inventive concept.

FIG. 14 is a conceptual diagram illustrating an operation of a driving controller of a display apparatus according to an embodiment of the present inventive concept The display apparatus and the method of driving the display panel according to the present embodiment is substantially the same as the display apparatus and the method of driving the display panel of the previous embodiment explained referring to FIGS. 1 to 12 except for the second image data. Thus, the same reference numerals will be used to refer to the same or like parts as those described in the previous embodiment of FIGS. 1 to 12 and any repetitive explanation concerning the above elements will be omitted.

Referring to FIGS. 1, 3 to 12 and 14, first image data include a normal image. The driving controller 200 may insert a compensation image to the first image data to generate second image data. For example, an upper portion of FIG. 14 represents the first image data including the normal images I1 to I8. A lower portion of FIG. 14 represents the second image data including the normal images I1 to I8 and the inserted compensation images B1 and B2.

The second image data may include the normal images I1 to I8 and black images B1 and B2 having a black grayscale value.

When the display panel 100 is driven in the normal driving method using the first image data, the black image may not be inserted into the display panel 100 so that the data signal processed by the driving controller 200 may include only normal images I1 to I8 as shown in the upper portion of FIG. 14.

When the display panel 100 is driven in the black insertion driving method using the second image data, the black image may be inserted into the image data so that the data signal processed by the driving controller 200 may include the normal images I1 to I8 and the black images B1 and B2 as shown in the lower portion of FIG. 14. In a normal driving method, an image may be displayed using the first image data. In a black insertion driving method, an image may be displayed using the second image data.

For example, a first unit of the first image data may include eight normal images I1 to I8 and a second unit of the second image data may include eight normal images I1 to I8 and two black images B1 and B2. Herein, the first unit and the second unit may have the same time duration PT. Thus, a second horizontal period H2 of the second image data may be shorter than a first horizontal period H1 of the first image data.

The driving controller 200 may insert the compensation image to the first image data IMG including the normal images to generate the second image data IMGB. The driving controller 200 may determine the data counting value DC corresponding to the normal images.

The gate driver 300 may shift the output time of the gate signal based on the data counting value DC and output the gate signal having the shifted output time to the display panel 100.

The data driver 500 may generate the data voltage based on the second image data IMGB and may output the data voltage to the display panel 100.

In addition, the driving controller 200 may determine the compensation counting value BC corresponding to the compensation images.

The gate driver 300 may shift the output time of the compensation gate signal based on the compensation counting value BC and output the compensation gate signal having the shifted output time to the display panel 100.

According to the present embodiment, the data counting value DC corresponding to the normal images may be determined and the output time of the gate signal may be determined based on the data counting value DC. The driving controller 200 may determine the gate shift value SV by considering the compensation image so that the accuracy of the gate shift value SV may be enhanced.

The charging rate of the pixel may be compensated using the accurate gate shift value SV so that the display quality of the display panel 100 may be enhanced.

Figure 15:
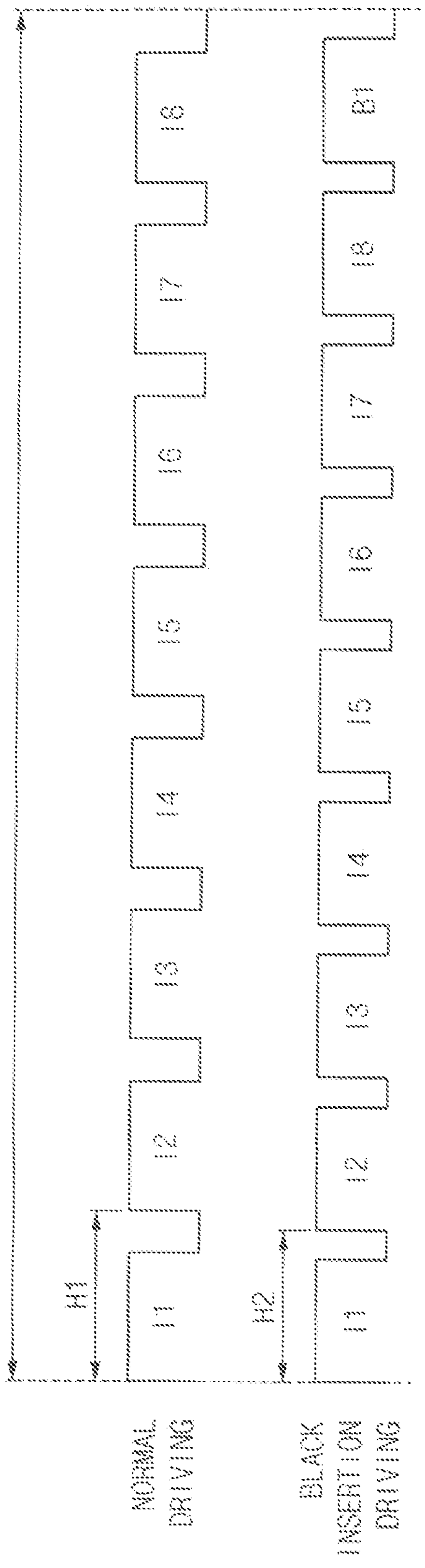
FIG. 15 is a conceptual diagram illustrating an operation of a driving controller of a display apparatus according to an embodiment of the present inventive concept.

FIG. 15 is a conceptual diagram illustrating an operation of a driving controller of a display apparatus according to an embodiment of the present inventive concept.

The display apparatus and the method of driving the display panel according to the present embodiment is substantially the same as the display apparatus and the method of driving the display panel of the previous embodiment explained referring to FIG. 14 except for the number of black image in the second image data. Thus, the same reference numerals will be used to refer to the same or like parts as those described in the previous embodiment of FIG. 14 and any repetitive explanation concerning the above elements will be omitted.

Referring to FIGS. 1, 3 to 12 and 15, first image data include a normal image. The driving controller 200 may insert a compensation image to the first image data to generate second image data. For example, an upper portion of FIG. 15 represents the first image data including the normal images I1 to I8. A lower portion of FIG. 15 represents the second image data including the normal images I1 to I8 and the inserted compensation image B1.

The second image data may include the normal images I1 to I8 and a black image B1 having a black grayscale value.

When the display panel 100 is driven in the normal driving method using the first image data, the black image may not be inserted into the display panel 100 so that the data signal processed by the driving controller 200 may include only normal images I1 to I8 as shown in the upper portion of FIG. 15.

When the display panel 100 is driven in the black insertion driving method using the second image data, the black image may be inserted into the image data so that the data signal processed by the driving controller 200 may include the normal images I1 to I8 and the black image B1 as shown in the lower portion of FIG. 15. In a normal driving method, an image may be displayed using the first image data. In a black insertion driving method, an image may be displayed using the second image data.

For example, a first unit of the first image data may include eight normal images I1 to I8 and a second unit of the second image data may include eight normal images I1 to I8 and one black image B1. Herein, the first unit and the second unit may have the same time duration PT. Thus, a second horizontal period H2 of the second image data may be shorter than a first horizontal period H1 of the first image data.

The driving controller 200 may insert the compensation image to the first image data IMG including the normal images to generate the second image data IMGB. The driving controller 200 may determine the data counting value DC corresponding to the normal images.

The gate driver 300 may shift the output time of the gate signal based on the data counting value DC and output the gate signal having the shifted output time to the display panel 100.

The data driver 500 may generate the data voltage based on the second image data IMGB and may output the data voltage to the display panel 100.

In addition, the driving controller 200 may determine the compensation counting value BC corresponding to the compensation images.

The gate driver 300 may shift the output time of the compensation gate signal based on the compensation counting value BC and output the compensation gate signal having the shifted output time to the display panel 100.

According to the present embodiment, the data counting value DC corresponding to the normal images may be determined and the output time of the gate signal may be determined based on the data counting value DC. The driving controller 200 may determine the gate shift value SV by considering the compensation image so that the accuracy of the gate shift value SV may be enhanced.

The charging rate of the pixel may be compensated using the accurate gate shift value SV so that the display quality of the display panel 100 may be enhanced.

According to the display apparatus, the method of driving the display panel and the display driving system of the display apparatus in the present inventive concept, the charging rate of the pixel may be compensated using the accurate gate shift value so that the display quality of the display panel may be enhanced.

The foregoing is illustrative of the present inventive concept and is not to be construed as limiting thereof. Although a few embodiments of the present inventive concept have been described, those skilled in the art will readily appreciate that many modifications are possible in the embodiments without materially departing from the novel teachings and advantages of the present inventive concept. Accordingly, all such modifications are intended to be included within the scope of the present inventive concept as defined in the claims. In the claims, means-plus-function clauses are intended to cover the structures described herein as performing the recited function and not only structural equivalents but also equivalent structures. Therefore, it is to be understood that the foregoing is illustrative of the present inventive concept and is not to be construed as limited to the specific embodiments disclosed, and that modifications to the disclosed embodiments, as well as other embodiments, are intended to be included within the scope of the appended claims. The present inventive concept is defined by the following claims, with equivalents of the claims to be included therein.

What is claimed is:

1. A display apparatus comprising:

a display panel;

a driving controller inserting a compensation image to first image data including a normal image to generate second image data;

a gate driver shifting an output time of a gate signal and outputting the gate signal having a shifted output time to the display panel; and a data driver generating a data voltage based on the second image data and outputting the data voltage to the display panel, wherein a gate shift value of a gate signal applied to a gate line for applying the compensation image is the same as a gate shift value of a gate line disposed immediately before the gate line for applying the compensation image, wherein the gate shift value is a difference in time between a gate signal applied to pixels connected to one gate line and data voltages applied to the pixels connected to the one gate line, and wherein the driving controller determines a compensation counting value corresponding to the compensation image.

2. The display apparatus of claim 1, wherein the driving controller determines a data counting value only corresponding to the normal image, and wherein the gate driver shifts an output time of the gate signal based on the data counting value.

3. The display apparatus of claim 2, wherein the data counting value is equal to a value obtained by subtracting a second line counting value corresponding to the compensation image from a first line counting value corresponding to the normal images and the compensation images.

4. The display apparatus of claim 2, wherein the driving controller includes a compensation image inserter generating the second image data based on the first image data and adding a pulse corresponding to the compensation image to a first data enable signal corresponding to the first image data to generate a second data enable signal corresponding to the second image data.

5. The display apparatus of claim 4, wherein the compensation image inserter generates a compensation flag corresponding to the compensation image.

6. The display apparatus of claim 5, wherein the driving controller further comprises:

a gate shifter determining the data counting value and the compensation counting value corresponding to the compensation image based on the compensation flag and the second data enable signal, determining a first shift value of the gate signal based on the data counting value and a second shift value of a compensation gate signal based on the compensation counting value, and outputting the first shift value and the second shift value to the gate driver.

7. The display apparatus of claim 6, wherein the gate shifter accumulates active pulses of the second data enable signal to generate the data counting value when the compensation flag has an inactive state.

8. The display apparatus of claim 6, wherein the gate shifter determines the compensation counting value by multiplying a number of active pulses of the compensation flag by a number of gate lines for simultaneously writing the compensation image.

9. The display apparatus of claim 6, wherein the gate driver shifts the gate signal based on the first shift value, shifts the compensation gate signal based on the second shift value and outputs the gate signal and the compensation gate signal to the display panel.

10. The display apparatus of claim 4, wherein the driving controller further comprises:

a gate shifter generating a compensation flag corresponding to the compensation image, determining the data counting value and the compensation counting value corresponding to the compensation image based on the compensation flag and the second data enable signal, determining a first shift value of the gate signal based on the data counting value and a second shift value of a compensation gate signal based on the compensation counting value, and outputting the first shift value and the second shift value to the gate driver.

11. The display apparatus of claim 1, wherein the gate driver shifts an output time of a compensation gate signal based on the compensation counting value and outputs the compensation gate signal having a shifted output time to the display panel.

12. The display apparatus of claim 1, wherein the second image data include the normal image, a black image having a black grayscale value and a precharge image for precharging a pixel prior to charging the normal image to the pixel.

13. The display apparatus of claim 12, wherein a first unit of the first image data includes eight normal images and a second unit of the second image data includes eight normal images, one black image and one precharge image, and wherein the first unit and the second unit have the same time duration.

14. The display apparatus of claim 1, wherein the second image data include the normal image and a black image having a black grayscale value.

15. The display apparatus of claim 14, wherein a first unit of the first image data includes eight normal images and a second unit of the second image data includes eight normal images and two black images, and wherein the first unit and the second unit have the same time duration.

16. The display apparatus of claim 14, wherein a first unit of the first image data includes eight normal images and a second unit of the second image data includes eight normal images and one black image, and wherein the first unit and the second unit have the same time duration.

17. A method of driving a display panel, the method comprising:

inserting a compensation image to first image data including a normal image to generate second image data;

determining a compensation counting value corresponding to the compensation image;

shifting an output time of a gate signal;

outputting the gate signal having a shifted output time to the display panel;

generating a data voltage based on the second image data; and outputting the data voltage to the display panel, wherein a gate shift value of a gate signal applied to a gate line for applying the compensation image is the same as a gate shift value of a gate line disposed immediately before the gate line for applying the compensation image, and wherein the gate shift value is a difference in time between a gate signal applied to pixels connected to one gate line and data voltages applied to the pixels connected to the one gate line.

18. The method of claim 17, further comprising determining a data counting value corresponding to the normal image, wherein an output time of the gate signal is shifted based on the data counting value.

19. The method of claim 18, wherein the data counting value is equal to a value obtained by subtracting a second line counting value corresponding to the compensation image from a first line counting value corresponding to the normal images and the compensation images.

20. The method of claim 17, further comprising:

shifting an output time of a compensation gate signal based on the compensation counting value; and outputting the compensation gate signal having a shifted output time to the display panel.

21. A display apparatus comprising:

a display panel;

a driving controller inserting a compensation image to first image data including a normal image to generate second image data;

a gate driver shifting an output time of a gate signal and outputting the gate signal having a shifted output time to the display panel; and a data driver generating a data voltage based on the second image data and outputting the data voltage to the display panel, wherein, when an L-th compensation image is inserted between an M-th normal image and an M+1-th normal image, a second interval between an M-th gate pulse corresponding to the M-th normal image and an M+1-th gate pulse corresponding to the M+1-th normal image is greater than a first interval between an M−1-th gate pulse corresponding to an M−1-th normal image and the M-th gate pulse corresponding to the M-th normal image, where M is a positive integer equal to or greater than two and L is a positive integer, wherein, when a number of the compensation images inserted between the M-th normal image and the M+1-th normal image is N, the second interval is N+1 times the first interval, where N is a positive integer equal to or greater than 1, and wherein the driving controller determines a compensation counting value corresponding to the compensation image.

22. The display apparatus of claim 21, wherein N is two.

23. The display apparatus of claim 21, wherein N is one.

24. A display driving system comprising:

a driving controller inserting a compensation image to first image data including a normal image to generate second image data;

a gate driver shifting an output time of a gate signal and outputting the gate signal having a shifted output time; and a data driver generating a data voltage based on the second image data and outputting the data voltage, wherein a gate shift value of a gate signal applied to a gate line for applying the compensation image is the same as a gate shift value of a gate line disposed immediately before the gate line for applying the compensation image, wherein the gate shift value is a difference in time between a gate signal applied to pixels connected to one gate line and data voltages applied to the pixels connected to the one gate line, and wherein the driving controller determines a compensation counting value corresponding to the compensation image.

25. The display driving system of claim 24, wherein the driving controller is determining a data counting value only corresponding to the normal image, and wherein the gate driver is shifting an output time of the gate signal based on the data counting value.

26. The display driving system of claim 25, wherein the data counting value is equal to a value obtained by subtracting a second line counting value corresponding to the compensation image from a first line counting value corresponding to the normal images and the compensation images.

27. The display driving system of claim 24, wherein the gate driver shifts an output time of a compensation gate signal based on the compensation counting value and outputs the compensation gate signal having a shifted output time.

28. The display driving system of claim 24, wherein the driving controller and the data driver are integrally formed.

* * * * *